(12) United States Patent
Comino et al.

(10) Patent No.: US 7,408,006 B2
(45) Date of Patent: Aug. 5, 2008

(54) PERFLUOROELASTOMERIC COMPOSITIONS

(75) Inventors: Giovanni Comino, Milan (IT); Margherita Albano, Milan (IT); Marco Apostolo, Novara (IT)

(73) Assignee: Solvay Solexis S.P.A., Milan (IT)

( * ) Notice: Subject to any disclaimer, the term of this patent is extended or adjusted under 35 U.S.C. 154(b) by 279 days.

(21) Appl. No.: 11/155,890

(22) Filed: Jun. 20, 2005

(65) Prior Publication Data
US 2005/0282969 A1 Dec. 22, 2005

(30) Foreign Application Priority Data
Jun. 22, 2004 (IT) .......................... MI2004A1252

(51) Int. Cl.
*C08F 259/00* (2006.01)
(52) U.S. Cl. ..................................................... 525/276
(58) Field of Classification Search .................. 525/276
See application file for complete search history.

(56) References Cited

U.S. PATENT DOCUMENTS

| | | | |
|---|---|---|---|
| 3,810,874 A | 5/1974 | Mitsch et al. |
| 4,035,565 A | 7/1977 | Apotheker et al. |
| 4,214,060 A | 7/1980 | Apotheker et al. |
| 4,243,770 A | 1/1981 | Tatemoto et al. |
| 4,501,869 A | 2/1985 | Tatemoto et al. |
| 4,564,662 A | 1/1986 | Albin |
| 4,694,045 A | 9/1987 | Moore |
| 4,745,165 A | 5/1988 | Arcella et al. |
| 4,789,717 A | 12/1988 | Giannetti et al. |
| 4,831,085 A | 5/1989 | Okabe et al. |
| 4,864,006 A | 9/1989 | Giannetti et al. |
| 4,943,622 A | 7/1990 | Naraki et al. |
| 5,173,553 A | 12/1992 | Albano et al. |
| 5,585,449 A | 12/1996 | Arcella et al. |
| 5,902,857 A | 5/1999 | Wlassics et al. |
| 5,948,868 A | 9/1999 | Albano et al. |
| 6,310,142 B1 | 10/2001 | Apostolo et al. |
| 6,395,834 B1 | 5/2002 | Albano et al. |

FOREIGN PATENT DOCUMENTS

| | | |
|---|---|---|
| EP | 0 136 596 A2 | 4/1985 |
| EP | 0 199 138 B1 | 10/1986 |
| EP | 0 407 937 A1 | 1/1991 |
| EP | 0 410 351 A1 | 1/1991 |
| EP | 0 683 149 B1 | 11/1995 |
| EP | 0 769 520 A1 | 4/1997 |
| EP | 0 769 521 A1 | 4/1997 |
| EP | 0 769 521 B1 | 4/1997 |
| EP | 1 031 606 A1 | 8/2000 |

OTHER PUBLICATIONS

I. L. Knunyants et al; Fluorinated Dilodoalkanes and Diolefins; Iinstitute of Heteroorganic Compounds; Academy of Sciences; *ZV. Akad Nauk. SSSR, Seriya. Khimicheskaya,* No. 2; Feb. 1964; pp. 358-361.

*Primary Examiner*—Bernard Lipman
(74) *Attorney, Agent, or Firm*—Arent Fox LLP

(57) ABSTRACT

A crosslinking system of perfuoroelastomers curable by peroxidic way comprising:

as crosslinking agent, a bis-olefin having general formula:

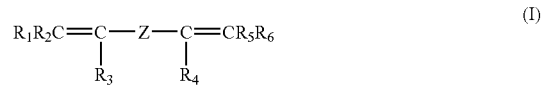

(I)

wherein:
$R_1, R_2, R_3, R_4, R_5, R_6$, equal to or different from each other, are H or $C_1$-$C_5$ alkyls;
Z is a $C_1$-$C_{18}$ linear or branched alkylene or cycloalkylene radical, optionally containing oxygen atoms, or a (per) fluoropolyoxyalkylene radical;
the bis-olefin amount, expressed in per cent by weight on the total of polymer, being from 0.6% to 1.8%;
peroxides for the peroxidic curing, capable to generate radicals by heating, in an amount from 0.2% to 1.3% by weight on the polymer.

24 Claims, No Drawings

PERFLUOROELASTOMERIC COMPOSITIONS

The present invention relates to perfluoroelastomeric compositions having an improved thermal resistance at high temperatures, even up to 350° C., preferably up to 340° C.

It is known that the fluoroelastomer curing can be carried out ionically and by peroxides. In the ionic curing, suitable curing agents, for example hydroxylated compounds such as bisphenol AF, associated to accelerating agents as, for example, tetraalkylammonium salts, phosphonium or aminophosphonium salts, are added to the fluoroeastomer. In the peroxidic curing the polymer must contain cure sites capable to form radicals in the presence of peroxides. For this reason during the polymerization cure-site monomers containing iodine and/or bromine are introduced in the chain, as described, for example, in patents U.S. Pat. No. 4,035,565, U.S. Pat. No. 4,745,165 and EP 199,138, or, alternatively or contemporaneously with the indicated system, chain transfer agents containing iodine and/or bromine can be used, giving iodinated and/or brominated end groups, see for example patents U.S. Pat. No. 4,243,770 and U.S. Pat. No. 5,173,553. The curing by peroxidic way is carried out according to known techniques, by addition of peroxides capable to generate radicals by heating, for example dialkylperoxides, as di-terbutyl-peroxide and 2,5-dimethyl-2,5-di(terbutylperoxy)-hexane, etc.

To the curing compound other components are then added, for example:
- curing coagents, among which the most commonly used are triallyl-cyanurate and preferably triallyl-isocyanurate (TAIC), etc.;
- a metal compound, in amounts between 1 and 15% by weight with respect to the polymer, selected from divalent metal oxides or hydroxides as, for example, Mg, Ca, etc.;
- other conventional additives, as mineral fillers, pigments, antioxidants, stabilizers and the like.

The ionically cured fluoroelastomers are more stable than the fluoroelatomers cured by peroxidic way when subjected to high temperatures (higher thermal resistance to high temperatures). In fact, with the ionic curing, cured articles are obtained maintaining good final properties, in particular thermal resistance even at temperatures higher than 250° C.

The fluoroelastomers cured by proxidic way are used at lower temperatures, up to 230° C., since at higher temperatures they show an evident loss of the mechanical properties. Therefore, according to the prior art, with the peroxidic curing it is not possible to obtain fluoroelastomers having a thermal resistance higher than 230° C.

Peroxidic crosslinking systems of iodine and/or bromine containing fluoroelastomers, wherein the crosslinking agent is a bis-olefin having general formula $R^I_1R^I_2C=C(R^I_3)-Z-C(R^I_4)=CR^I_5R^I_6$, are also known from patents U.S. Pat. No. 5,902,857 and U.S. Pat. No. 5,948,868, wherein the radicals R, equal to or different from each other, are H or alkyls; Z is a linear or branched alkylene or cycloalkylene radical, optionally containing oxygen atoms, preferably at least partially fluorinated, or a (per)fluoropolyoxyalkylene radical.

Said systems allow to improve the thermal resistance at high temperatures compared with systems wherein conventional crosslinking agents are used. However at temperatures of about 300° C. there is a substantial decay of the mechanical properties even using these crosslinking systems. For example, the stress at break, which, as known, is one of the most important properties of fluoroelastomers, suffers a loss of 85% with respect to the product before the thermal treatment. Furthermore, it is well known that a fluoroelastomer, to be used at temperatures up to 350° C., must have good compression set properties. In the two above mentioned U.S. patents only the compression set properties at 200° C. are reported.

Besides, it is known that high fluorine content fluoroelastomers, generally not containing VDF units in the backbone, cannot be ionically cured. Therefore crosslinked perfluoroelastomers can be obtained only by peroxidic way.

Therefore in the application fields where a high chemical resitance combined with a high thermal resistance at high temperatures, higher than 300° C. and up to 350° C., is required, the need was felt to have available cured articles allowing to obtain this combination of properties.

It has been surprisingly and unexpectedly found by the Applicant that it is possible to solve the above technical problem by using a particular peroxidic system to cure perfluoroelastomers.

An object of the present invention is a crosslinking system, or composition to crosslink perfluoroelastomers curable by peroxidic way and having an improved thermal resistance at high temperatures, higher than 300° C., up to 350° C., said system comprising:
- as crosslinking agent, a bis-olefin having general formula:

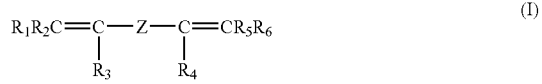

wherein:
- $R_1, R_2, R_3, R_4, R_5, R_6$, equal to or different from each other, are H or $C_1$-$C_5$ alkyls;
- Z is a $C_1$-$C_{18}$ linear or branched alkylene or cycloalkylene radical, optionally containing oxygen atoms, preferably at least partially fluorinated, or a (per)fluoropolyoxyalkylene radical;
- the amount of the bis-olefin, expressed in per cent by weight on the polymer, being from 0.6% to 1.8%;
- peroxides for the peroxidic curing, capable to generate radicals by heating, in an amount from 0.2% to 1.3% by weight on the polymer.

In formula (I) of the bis-olefin, Z is preferably a $C_4$-$C_{12}$, more preferably $C_4$-$C_8$, perfluoroalkylene radical; when Z is a (per)fluoropolyoxyalkylene radical, it can comprise units selected from the following:

—$CF_2CF_2O$—, —$CF_2CF(CF_3)O$—, —$CFX_1O$— wherein $X_1$=F, $CF_3$, —$CF_2CF_2CF_2O$—, —$CF_2$—$CH_2CH_2O$—, —$C_3F_6O$—;

while $R_1, R_2, R_3, R_4, R_5, R_6$ are preferably hydrogen.

Preferably Z has formula:

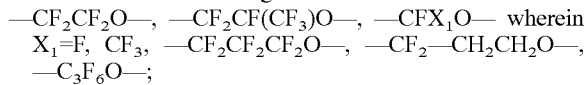

wherein: Q is a $C_1$-$C_{10}$ alkylene or oxyalkylene radical; p is 0 or 1; m and n are numbers such that the m/n ratio is between 0.2 and 5 and the number average molecular weight of said (per)fluoropolyoxyalkylene radical is in the range 300-10,000, preferably 700-2,000.

Preferably Q in the bis-olefin is selected from:
—$CH_2OCH_2$—; —$CH_2O(CH_2CH_2O)_sCH_2$—, s=1-3.

The bis-olefins of formula (I) wherein Z is an alkylene or cycloalkylene radical can be prepared according to what described, for example, by I. L. Knunyants et al. in "Izv. Akad. Nauk. SSSR", Ser. Khim., 1964(2), 384-6, while the bis-olefins containing (per)fluoropolyoxyalkylene sequences are described in patent U.S. Pat. No. 3,810,874.

The preferred amount of the bis-olefin is from 0.9% to 1.5% by weight with respect to the polymer.

The preferred peroxide amount is from 0.4% to 0.8% by weight on the polymer.

The perfluoroelastomers curable by peroxidic way with the crosslinking system according to the present invention are those containing iodine and/or bromine, preferably iodine, as radical attack site. Said perfluoroelastomers curable by peroxidic way are for example those described in EP 769,521.

The perfluoroelastomers curable by peroxidic way contain iodine in amounts generally between 0.001% and 5% by weight, preferably between 0.01% and 2.5% by weight with respect to the total polymer weight. The iodine atoms can be present along the chain and/or in end position.

To introduce iodine atoms along the chain, the copolymerization of the basic monomers of the fluoroelastomer is carried out with a suitable fluorinated comonomer containing iodine (cure-site monomers), see, for example, patents U.S. Pat. No. 4,745,165, U.S. Pat. No. 4,831,085, U.S. Pat. No. 4,214,060, EP 683,149. Said fluorinated comonomer containing iodine can be selected for example from the following compounds:

(a) iodo(per)fluoroalkyl-perfluorovinylethers of formula:

$$I-R_f-O-CF=CF_2 \quad (III)$$

wherein $R_f$ is a $C_1$-$C_{12}$ (per)fluoroalkylene, optionally containing chlorine and/or ether oxygen atoms; for example: $ICF_2-O-CF=CF_2$, $ICF_2CF_2-O-CF=CF_2$, $ICF_2CF_2CF-O-CF=CF_2$, $CF_3CFICF_2-O-CF=CF_2$, and the like;

(b) iodo-(per)fluoroolefins of formula:

$$I-R'_f-CF=CF_2 \quad (IV)$$

wherein $R'_f$ is a $C_1$-$C_{12}$ (per)fluoroalkylene, optionally containing chlorine atoms; for example: iodotrifluoroethylene, 1-iodo-2,2-difluoroethylene, iodo-3,3,4,4-tetrafluorobutene-1,4-iodo-perfluorobutene-1, and the like;

(c) iodo-(per)fluoroolefins of formula:

$$CHR_o=CH-Z_o-CH_2CHR_o-I \quad (V)$$

wherein: $R_o$ is H or $-CH_3$; $Z_o$ is a $C_1$-$C_{18}$ linear or branched (per)fluoroalkylene radical, optionally containing one or more oxygen atoms, or a (per) fluoropolyoxyalkylene radical as above.

Other cure-site iodinated comonomers are the iodofluoroalkylvinylethers, see patents U.S. Pat. No. 4,745,165 and U.S. Pat. No. 4,564,662.

Alternatively, or in addition to the iodinated comonomer, the fluoroelastomer can contain iodine atoms in end position, deriving from a suitable iodinated chain transfer agent introduced in the reaction medium during the polymer preparation, as described in patent U.S. Pat. No. 4,501,869. Said transfer agents have formula $R^A_f(I)_x$, wherein $R^A_f$ is a $C_1$-$C_{12}$ (per)fluoroalkyl radical, optionally containing chlorine atoms, while x is 1 or 2. Said transfer agents can be selected, for example, from: $CF_2I_2$, $I(CF_2)_6I$, $I(CF_2)_4I$, $CF_2ClI$, $CF_3CFICF_2I$, and the like.

For the iodine introduced as chain end group by the addition of iodinated chain transfer agents as above see, for example, patents U.S. Pat. No. 4,243,770 and U.S. Pat. No. 4,943,622.

It is also possible to use as chain transfer agents alkaline or alkaline-earth metal iodides, according to patent application EP 407,937.

In combination with the chain transfer agents containing iodine, other known chain transfer agents of the prior art, as ethyl acetate, diethylmalonate, etc., can be used.

The iodine amount in end position of the perfluoroelastomer is generally between 0.001% and 3%, preferably between 0.01% and 1% by weight with respect to the fluoroelastomer weight. See patents U.S. Pat. No. 4,035,565 and U.S. Pat. No. 4,694,045.

Furthermore the perfluoroelastomers curable by peroxidic way can contain, alternatively or in combination with iodine, also bromine, in the chain and in end position. The bromine in the chain can be introduced according to known techniques; see, for example, patents U.S. Pat. No. 4,035,565, U.S. Pat. No. 4,745,165, EP 199,138; or as end bromine as described in U.S. Pat. No. 4,501,869.

The perfluoroelastomers are TFE copolymers with at least one perfluorinated olefin having one unsaturation, preferably terminal, of ethylene type. In particular in said copolymers the comonomer is selected from:

- $CF_2=CFOR_{2f}$ (per) fluoroalkylvinylethers (PAVE), wherein $R_{2f}$ is a $C_1$-$C_6$ (per)fluoroalkyl, for example trifluoromethyl, bromotrifluoromethyl, pentafluoropropyl;
- $CF_2=CFOX_0$ (per)fluoro-oxyalkylvinylethers, wherein $X_0$ is: a $C_1$-$C_{12}$ (per) fluorooxyalkyl, containing one or more ether groups, for example perfluoro-2-propoxypropyl; (per)fluorovinylethers called MOVE having general formula:

$$CFX_2=CX_2OCF_2OR''_f \quad (I\text{-}B)$$

wherein
$R''_f$ has the following meanings:
- $C_2$-$C_6$ linear or branched (per)fluoroalkyl,
- $C_5$-$C_6$ cyclic (per)fluoroalky,
- $C_2$-$C_6$ linear or branched (per)fluorooxyalkyl containing from one to three oxygen atoms,
- $X_2$=F, H.

Preferably the (per)fluorovinylethers of formula (I-B) have the following general formula:

$$CFX_2=CX_2OCF_2OCF_2CF_2Y \quad (II\text{-}B)$$

wherein Y=F, $OCF_3$; $X_2$ is as above defined.

The perfluorovinylethers of formula:

$$CF_2=CFOCF_2OCF_2CF_3 \quad (MOVE1)$$

$$CF_2=CFOCF_2OCF_2CF_2OCF_3 \quad (MOVE2)$$

are more preferred.

Preferred basic monomeric compositions are the following, expressed in % by moles:

TFE 50-85%, PAVE 15-50%;
TFE 50-85%, MOVE 15-50%;

the monomer sum being 100% by moles.

The perfluoroelastomers curable by peroxidic way with the crosslinking system of the present invention can optionally contain also units deriving from VDF, $C_3$-$C_8$ fluoroolefins, optionally containing hydrogen atoms, chlorine and/or bromine and/or iodine, $C_2$-$C_8$ non fluorinated olefins (O1). In this case (per)fluoroelastomers are obtained. Examples of fluoroelastomer compositions containing said comonomers are the following:

A)
33-75% by moles of tetrafluoroethylene (TFE), preferably 40-60%;
15-45% by moles of a perfluorovinylether (PAVE), preferably 20-40%;
2-25% by moles of vinylidene fluoride (VDF), preferably 15-20%;

B)

TFE 32-60%, PAVE 20-40%; O110-40%;

the sum of the moles of the compositions of A) and B) being 100%, respectively.

In the above mentioned compositions, at the place or in combination with PAVE vinylethers, (per) fluorovinylethers MOVE can be used, with the proviso that the total vinylether % is within the limits indicated above for the compositions A) and B), respectively. In the compositions A) and B) as preferred perfluorovinylethers PAVE, perfluoromethylvinylether, perfluoroethylvinylether, perfluoropropylvinylether can be mentioned.

The perfluoroelastomers can contain also monomeric units in the chain deriving from small amounts of a bis-olefin of the above general formula (I), according to patent U.S. Pat. No. 5,585,449, generally the bis-olefin amount in the perfluoroelastomer ranges from 0.01% to 5% by moles with respect to the polymer.

The curing by peroxidic way is carried out according to known techniques, by addition of peroxides capable to generate radicals by heating. Among the most commonly used there are: dialkylperoxides as, for example, di-terbutyl-peroxide and 2,5-dimethyl-2,5-di(terbutylperoxy)hexane; dicumyl peroxide; dibenzoyl peroxide; diterbutyl perbenzoate; di [1,3-dimethyl-3-(terbutylperoxy)butyl]-carbonate. Other peroxidic systems are described, for example, in patent applications EP 136,596 and EP 410,351.

Other components are then added to the curing compound, for example the following:

a metal compound, in an amount between 0 and 15%, preferably between 2 and 10% by weight with respect to the polymer, selected from divalent metal oxides or hydroxides as, for example, Mg, Zn, Ca or Pb, optionally combined with a weak acid salt, as stearates, benzoates, carbonates, oxalates or phosphites of Ba, Na, K, Pb, Ca;

other conventional additives, as reinforcing fillers, pigments, antioxidants, stabilizers and the like. Among fillers, carbon black, barium sulphate, silicates, semicrystalline (per)fluoropolymers, for example selected between PTFE or PTFE modified with comonomers, can be mentioned.

The preparation of the perfluoroelastomers of the present invention can be carried out by copolymerization of the monomers in aqueous emulsion according to well known methods of the prior art, in the presence of radical initiators (for example alkaline or ammonium persulphates, perphosphates, perborates or percarbonates), optionally with ferrous or silver salts, or other easily oxidizable metals. Surfactants as, for example, (per)fluoroalkyl carboxylates or sulphonates (for example ammonium perfluorooctanoate) or (per)fluoropolyoxy-alkylene carboxylates or sulphonates, or others known in the prior art are also present in the reaction medium.

At the end of the polymerization, the fluoroelastomer is isolated from the emulsion by conventional methods, as coagulation by addition of electrolytes or by cooling.

Alternatively, the polymerization reaction can be carried out in mass or in suspension, in an organic liquid wherein a suitable radical initiator is present, according to well known techniques.

The polymerization reaction is generally carried out at temperatures in the range 25° C.-150° C., under pressure up to 10 MPa.

The preparation of the fluoroelastomers of the present invention is preferably carried out in aqueous emulsion in the presence of an emulsion, dispersion or microemulsion of perfluoropoly-oxyalkylenes, according to patents U.S. Pat. No. 4,789,717 and U.S. Pat. No. 4,864,006, which are herein incorporated by reference.

Optionally the invention perfluoroelastomers contain a semicrystalline (per)fluoropolymer, in an amount in per cent by weight referred to the total dry weight perfluoroelastomer+semicrystalline (per)fluoropolymer, from 0% to 70%, preferably from 0% to 50% by weight, still more preferably from 2% to 30% by weight.

With semicrystalline (per)fluoropolymer it is meant a (per)fluoropolymer showing, besides the glass transition temperature Tg, at least a crystalline melting temperature.

The semicrystalline (per)fluoropolymer is constituted of tetrafluoroethylene (TFE) homopolymers, or TFE copolymers with one or more monomers containing at least one unsaturation of ethylene type, in an amount from 0.01% to 10% by moles, preferably from 0.05% to 7% by moles.

Said comonomers having an ethylene unsaturation are of hydrogenated and fluorinated type. Among those hydrogenated ones, ethylene, propylene, acrylic monomers, for example methylmethacrylate, (meth)acrylic acid, butylacrylate, hydroxyethylhexylacrylate, styrene monomers, can be mentioned.

Among fluorinated comonomers it can be mentioned:

$C_3$-$C_8$ perfluoroolefins, such as hexafluoropropene (HFP), hexafluoroisobutene;

$C_2$-$C_8$ hydrogenated fluoroolefins, as vinyl fluoride (VF), vinylidene fluoride (VDF), trifluoroethylene, $CH_2$=CH—$R_f$ perfluoroalkylethylene, wherein $R_f$ is a $C_1$-$C_6$ perfluoroalkyl;

$C_2$-$C_8$ chloro- and/or bromo- and/or iodo-fluoroolefins, such as chlorotrifluoroethylene (CTFE);

$CF_2$=CFOR$_f$ (per)fluoroalkylvinylethers (PAVE), wherein $R_f$ is a $C_1$-$C_6$ (per)fluoroalkyl, for example $CF_3$, $C_2F_5$, $C_3F_7$;

$CF_2$=CFOX (per)fluoro-oxyalkylvinylethers, wherein X is: a $C_1$-$C_{12}$ alkyl, or a $C_1$-$C_{12}$ oxyalkyl, or a $C_1$-$C_{12}$ (per)fluoro-oxyalkyl having one or more ether goups;

(per)fluorodioxoles, preferably perfluorodioxoles.

PAVES, in particular perfluoromethyl-, perfluoroethyl-, perfluoropropylvinylether and (per)fluorodioxoles, preferably perfluorodioxoles, are preferred comonomers.

Optionally the semicrystalline (per)fluoropolymer is coated by a shell of a semicrystalline (per)fluoropolymer containing bromine and/or iodine atoms in the chain deriving from brominated and/or iodinated comonomers, in an amount from 0.1% to 10% by moles referred to the total moles of the basic monomeric units of the semicrystlaline (per) fluoropolymer core+shell, the semicrystalline (per)fluoropolymer in the core and in the shell can be of different composition. See EP 1,031,606.

The preparation of said semicrystalline (per)fluoropolymers is carried out by polymerization of the monomers in aqueous emulsion in the presence of an emulsion, dispersion or microemulsion of perfluoropolyoxyalkylenes, according to patents U.S. Pat. No. 4,789,717 and U.S. Pat. No. 4,864,006. Preferably the synthesis is carried out in the presence of a perfluoropolyoxyalkylene microemulsion.

When the perfluoroelastomers of the present invention contain semicrystalline (per) fluoropolymers, mixing is carried out by mixing in the desired ratios the perfluoroelastomer latex with the semicrystalline (per)fluoropolymer latex and then co-coagulating the obtained mixture as described in patents U.S. Pat. No. 6,395,834 and U.S. Pat. No. 6,310,142.

Alternatively the semicrystalline (per) fluoropolymer can be polymerized and then the perfluoroelastomer is polymerized on the (per)fluoropolymer particles. It is thus obtained a core-shell structure.

The following Examples are given for illustrative and not limitative purposes of the present invention.

EXAMPLES

Example 1

Polymerization

In a 22 litre steel autoclave, equipped with stirrer working at 460 rpm there have been introduced, after evacuation, 14.5 litres of demineralized water and 145 ml of a microemulsion obtained by mixing:

- 32 ml of a perfluoropolyoxyalkylene having average molecular weight 600, having acid end group of formula:

$CF_2ClO(CF_2-CF(CF_3)O)_n(CF_2O)_mCF_2COOH$ wherein n/m=10;
- 32 ml of an aqueous solution of $NH_3$ at 30% by volume;
- 62 ml of demineralized water;
- 19 ml of Galden® D02 having average molecular weight 450 formula:

$CF_3O(CF_2-CF(CF_3)O)_n(CF_2O)_mCF_3$ wherein n/m=20.

The autoclave was then heated to 80° C. and maintained at said temperature for the whole reaction. Then 35 g of 1,4-diiodoperfluorobutane ($C_4F_8I_2$) were introduced in the autoclave.

The mixture of monomers having the following molar composition is then fed:
- tetrafluoroethylene (TFE) 35%;
- perfluoromethylvinylether (MVE) 65%;

so as to bring the pressure to 25 bar rel (2.5 MPa).

In the autoclave there are then introduced:
- 0.7 g of ammonium persulphate (APS) as initiator;
- 18 g of bis-olefin of formula $CH_2=CH-(CF_2)_6-CH=CH_2$.

The bis-olefin addition was carried out in 20 portions, each of 0.9 g, starting from the polymerization beginning and for every 5% increase in the monomer conversion.

The pressure of 25 bar rel (2.5 MPa) is maintained constant for the whole polymerization by feeding a mixture having the following molar composition: tetrafluoroethylene (TFE) 60%, perfluoromethylvinylether (MVE) 40%.

After 160 minutes of reaction, corresponding to 100% of monomer conversion, the autoclave is cooled and the latex discharged.

The so obtained latex has a concentration equal to 290 $g_{polymer}/kg_{latex}$ and is used in the invention Examples and in the comparative Examples.

The latex is coagulated by dropping in a nitric acid solution. The obtained polymer is dried at 90° C. in an air-circulating oven for 16 hours.

The dried polymer is mixed with the following crosslinking ingredients:
- Bis-olefin, having formula $CH_2=CH-(CF_2)_6-CH=CH_2$;
- 2,5-dimethyl-2,5-di(terbutylperoxy)hexane Luperox®101;
- ZnO;
- reinforcing fillers:
  - Carbon black Austin Black®;
  - Carbon black Sevacarb® MT-LS;

in the amounts (phr) indicated in Table 1 for the various Examples.

The so obtained blend is molded for 10 minutes at 170° C. and characterized under the conditions indicated in Table 1.

In Table 1 "n.d." means not determinable.

Comment to the Table

From the Table it is observed that the compositions of the invention Examples 2-3, after thermal treatment at 316° C. for 70 hours, maintain good mechanical and compression set properties. The compositions wherein the bis-olefin content is higher than the limits of the present invention (Examples 4-6 comp.), after thermal treatment under the above conditions show poor mechanical properties.

In particular Table 1 shows that Δt of the elongation at break in the Examples 4 and 5 comp. is higher than 100% and the compression set is not determinable, while for Example 6 comp. all the mechanical properties are not determinable.

TABLE 1

| | Ex. 2 | Ex. 3 | Ex. 4 comp | Ex. 5 comp | Ex. 6 comp |
|---|---|---|---|---|---|
| Polymer Ex. 1 | 100 | 100 | 100 | 100 | 100 |
| bis-olefin | 1.0 | 1.5 | 2.0 | 2.5 | 4.0 |
| Luperox ® 101 | 0.7 | 0.7 | 0.7 | 0.7 | 0.7 |
| ZnO | 5 | 5 | 5 | 5 | 5 |
| Austin Black ® | 8 | 8 | 8 | 8 | 8 |
| Sevacarb ® MT-LS | 7 | 7 | 7 | 7 | 7 |
| Mechanical properties after post-treatment: 8 hours of gradient + 16 residence hours at 290° C. (ASTM D 412C) | | | | | |
| Stress at break (MPa) | 18.6 | 18.4 | 17.9 | 14.9 | 15.4 |
| Elongation at break (%) | 180 | 190 | 183 | 194 | 180 |
| Hardness (Shore A) | 73 | 73 | 72 | 72 | 72 |
| Thermal treatment: 70 hours at 316° C. (ASTM D 573) | | | | | |
| Δ% Stress at break | −50 | −40 | −73 | −74 | n.d. |
| Δ% Elongation at break | +85 | +70 | +148 | +173 | n.d. |
| Δ Hardness (Shore A) | −2 | −2 | −3 | −3 | n.d. |
| Compression set: 70 hours at 316° C. (ASTM D 395 method B) | | | | | |
| O-ring #214 | 75 | 63 | n.d. | n.d. | n.d. |

The invention claimed is:

1. A crosslinking system of perfuoroelastomers curable by peroxidic way, having an improved thermal resistance at high temperatures, higher than 300° C., up to 350° C., comprising:
   as crosslinking agent, a bis-olefin having general formula:

$$R_1R_2C=C-Z-C=CR_5R_6 \atop \phantom{R_1R_2C=}R_3\phantom{-Z-}R_4 \quad (I)$$

wherein:
   $R_1, R_2, R_3, R_4, R_5, R_6$, equal to or different from each other, are H or $C_1$-$C_5$ alkyls;
   Z is a $C_1$-$C_{18}$ linear or branched alkylene or cycloalkylene radical, optionally containing oxygen atoms, or a (per) fluoropolyoxy-alkylene radical;
the amount of the bis-olefin, expressed in per cent by weight on the total polymer, being from 0.6% to 1.8%;
   peroxides for the peroxidic curing, capable to generate radicals by heating, in an amount from 0.2% to 1.3% by weight on the polymer.

2. A crosslinking system according to claim 1, wherein in formula (I) of the bis-olefin, Z is a $C_4$-$C_{12}$ perfluoroalkylene radical, or a (per) fluoropolyoxyalkylene radical comprising units selected from the following:
   $-CF_2CF_2O-$, $-CF_2CF(CF_3)O-$, $-CFX_1O-$ wherein $X_1$=F, $CF_3$,
   $-CF_2CF_2CF_2O-$, $-CF_2-CH_2CH_2O-$, $-C_3F_6O-$;
   while $R_1, R_2, R_3, R_4, R_5, R_6$ are hydrogen.

3. A crosslinking system according to claim 2, wherein Z has the following formula:

$$-(Q)_pCF_2O-(CF_2CF_2O)_m(CF_2O)_n-CF_2-(Q)_p- \quad (II)$$

wherein Q is a $C_1$-$C_{10}$ alkylene or oxyalkylene radical; p is 0 or 1; m and n are numbers such that the mm ratio is between 0.2 and 5 and the number average molecular weight of said (per)fluoropolyoxyalkylene radical is in the range 300-10, 000.

4. A crosslinking system according to claim 3, wherein Q is selected from:

—$CH_2OCH_2$—; —$CH_2O$ $(CH_2CH_2O)_s$$CH_2$—, s being =1-3.

5. A crosslinking system according to any one of claims 1-4, wherein the bis-olefin amount is from 0.9% to 1.5% by weight with respect to the polymer and that of peroxide is from 0.4% to 0.8% by weight on the polymer.

6. A crosslinking system according to claim 1, wherein the perfluoroelastomers curable by peroxidic way contain iodine and/or bromine as radical attack site.

7. A crosslinking system according to claim 1, wherein the perfluoroelastomers curable by peroxidic way are TFE copolymers with at least one perfluorinated olefin having one unsaturation of ethylene type.

8. A crosslinking system according to claim 7, wherein in said copolymers the comonomer is selected from:

$CF_2=CFOR_{2f}$ (per)fluoroalkylvinylethers (PAVE), wherein $R_{2f}$ is a $C_1$-$C_6$ (per) fluoroalkyl;

$CF_2=CFOX_0$ (per)fluoro-oxyalkylvinylethers, wherein $X_o$ is a $C_1$-$C_{12}$ (per)fluorooxyalkyl, containing one or more ether groups; (per)fluorovinylethers having general formula:

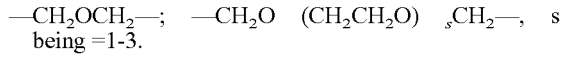

$CFX_2=CX_2OCF_2OR''_f$ (I-B)

wherein $R''_f$ has the following meanings:

$C_2$-$C_6$ linear or branched (per) fluoroalkyl,
$C_5$-$C_6$ cyclic perfluoroalkyl,
$C_2$-$C_6$ linear or branched perfluorooxyalkyl containing from one to three oxygen atoms,
$X_2$=F, H.

9. A crosslinking system according to claim 8, wherein the (per) fluorovinylethers of formula (I-B) have the following formula:

$CFX_2=CX_2OCF_{2OCF2}CF_2Y$ (II-B)

wherein Y=F, $OCF_3$; $X_2$ is as above.

10. A crosslinking system according to claim 9, wherein the perfluorovinylethers have the following formulas:

$CF_2=CFOCF_2OCF_2CF_3$ (MOVE 1)

$CF_2=CFOCF_2OCF_2CF_2OCF_3$ (MOVE2).

11. A crosslinking system according to claim 1 wherein the monomeric compositions of the perfluoroelastomers curable by peroxidic way are the following, expressed in % by moles:

TFE 50-85%, PAVE 15-50%;
TFE 50-85%, MOVE 15-50%;
the monomer sum being 100% by moles.

12. A crosslinking system according to claim 1 wherein the perfluoroelastomers optionally contain also units deriving from VDF, $C_3$-$C_8$ fluoroolefins, optionally containing hydrogen atoms, chlorine and/or bromine and/or iodine, $C_2$-$C_8$ non fluorinated olefins (Ol).

13. A crosslinking system according to claim 12, wherein the monomeric compositions are the following:

A)
33-75% by moles of tetrafluoroethylene (TFE);
15-45% by moles of a perfluorovinylether (PAVE);
2-25% by moles of vinylidene fluoride (VDF);

B)
TFE 32-60%, PAVE 20-40%; Ol 10-40%;
the sum of the moles of the compositions of A) and B) being 100%, respectively.

14. A crosslinking system according to claim 1, wherein the perfluoroelastomers contain in the chain monomeric units deriving from a bis-olefin of general formula (I), the bis-olefin amount in the perfluoroelastomer ranging from 0.01% to 5% by moles with respect to the polymer.

15. A crosslinking system according to claim 1, wherein the perfluoroelastomers contain a semicrystalline (per)fluoropolymer, in an amount in per cent by weight referred to the total dry weight perfluoroelastomer +semicrystalline (per) fluoropolymer, from 0% to 70% by weight.

16. A crosslinking system according to claim 15, wherein the semicrystalline (per)fluoropolymer is constituted of tetrafluoroethylene (TFE) homopolymers, or TFE copolymers with one or more monomers containing at least one unsaturation of ethylene type, in an amount from 0.01% to 10% by moles on the total of the monomer moles.

17. A crosslinking system according to claim 16, wherein the comonomers having an ethylene unsaturation of the semicrystalline (per) fluoropolymer are both hydrogenated and fluorinated.

18. A crosslinking system according to claim 17, wherein the hydrogenated comonomers having an ethylene unsaturation are selected among ethylene, propylene, acrylic monomers, selected from methylmethacrylate, (meth)acrylic acid, butylacrylate, hydroxyethylhexylacrylate, styrene monomers.

19. A crosslinking system according to claim 17, wherein the fluorinated comonomers having an ethylene unsaturation are selected from the following:

$C_3$-$C_8$ perfluoroolefins;
$C_2$-$C_8$ hydrogenated fluoroolefins;
$C_2$-$C_8$ chloro- and/or bromo- and/or iodo-fluoroolefins, as chlorotrifluoroethylene (CTFE);
$CF_2=CFOR_f$ (per)fluoroalkylvinylethers (PAVE), wherein $R_f$ is a $C_1$-$C_6$ (per) fluoroalkyl;
$CF_2=CFOX$ (per)fluoro-oxyalkylvinylethers, wherein X is: a $C_1$-$C_{12}$ alkyl, or a $C_1$-$C_{12}$ oxyalkyl, or a $c_1$-$C_{12}$ (per) fluoro-oxyalkyl having one or more ether groups;
(per)fluorodioxoles.

20. A crosslinking system according to claim 15, wherein the comonomers of the semicrystalline (per)fluoropolymer are selected among PAVEs and (per)fluorodioxoles.

21. A crosslinking system according to claim 15, wherein the semicrystalline (per)fluoropolymer is coated by a shell of a semicrystalline (per)fluoropolymer containing bromine and/or iodine atoms in the chain deriving from brominated and/or iodinated comonomers, in an amount from 0.1% to 10% by moles referred to the total moles of the basic monomeric units of the semicrystlaline (per)fluoropolymer core+ shell, the semicrystalline (per)fluoropolymer in the core and in the shell can be of different composition.

22. Perfluoroelastomers cured by peroxidic way with the crosslinking system of claim 1.

23. Manufactured articles obtained by the cured perfluoroelastomers according to claim 22.

24. A crosslinking system according to claim 1, wherein Z is a $C_1$-$C_{18}$ linear or branched alkylene or cycloalkylene radical that is at least partially fluorinated.

* * * * *